April 5, 1932.  L. ROUSH  1,852,267
METHOD OF PREPARING WHIPPED CREAM
Filed May 10, 1930
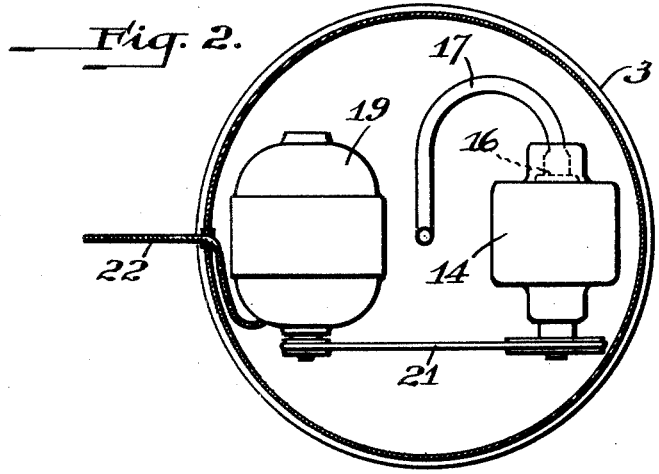
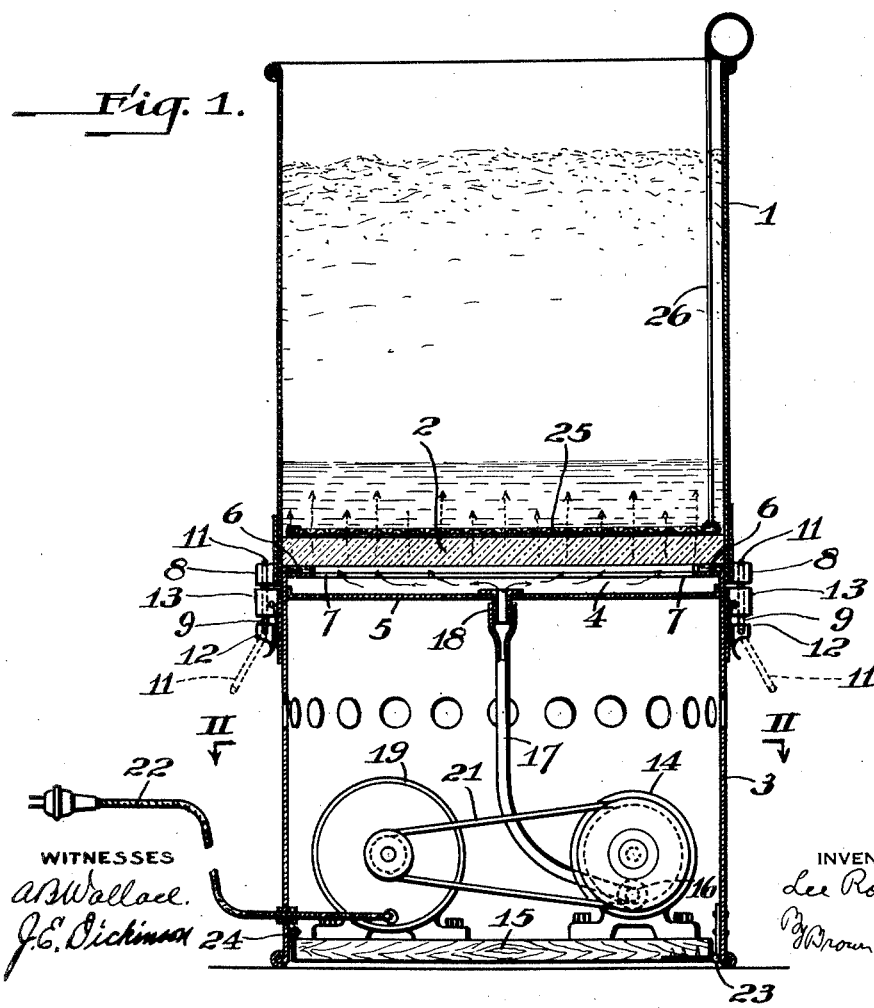

Patented Apr. 5, 1932

1,852,267

UNITED STATES PATENT OFFICE

LEE ROUSH, OF BEAVER, PENNSYLVANIA

METHOD OF PREPARING WHIPPED CREAM

Application filed May 10, 1930. Serial No. 451,315.

This invention relates to an improved method for making what is known in the culinary art as whipped cream.

Heretofore it has been the customary practice to make whipped cream by beating or actually whipping the cream. This is done by agitating the cream, by means of some suitable agitating device, until sufficient air is entrapped in the cream, in minute quantities, to maintain it in a substantially stable non-viscous state. Before cream can be whipped satisfactorily in such a manner it is essential that it be cooled to a comparatively low temperature, and that it have a comparatively high percentage of butter fat. Also, that it neither be too old nor too fresh. If these conditions are not substantially adhered to, the cream will frequently either not whip or else the agitation will produce butter before it does a whip. Furthermore, where the cream has once been whipped by an agitating process and is permitted to stand for any length of time and collapse, it is practically impossible to rewhip it. This is due chiefly to the destructive action the agitating devices have upon the emulsified structure of the cream, and it is not infrequent because of this that quantities of cream are rendered a total loss, as far as their use for whipping purposes is concerned, or at least a considerable part of their volume destroyed if it is allowed to set any length of time before being used.

The primary object of this invention is to provide a method and apparatus for whipping cream whereby the above noted difficulties are substantially overcome, the whipping operation considerably simplified, and through the use of which not only creams having relatively low butter fat content may be satisfactorily whipped, but the volume of whipped cream obtainable from them greatly increased.

My invention is predicated upon my discovery that a whip superior to any heretofore obtainable can be produced by dispersing minute streams of air under pressure into a stationary body of cream, the addition of air being continued until a sufficient amount is entrapped in the cream to produce a whip.

In practicing the invention I have found that creams of considerably lower butter fat content, than those which may be whipped by agitating means may be satisfactorily whipped in accordance with the invention, and in much less time. Furthermore, that the temperature and age of the cream is not nearly so critical to the whip and that the life of the whip produced is considerably increased, as well as the volume. I have also found that where the whip is permitted to stand and collapse that it can be quickly and easily rewhipped to its original state, which it is practically impossible to do with a whip produced by agitating devices.

The method consists broadly in dispersing air under pressure in very finely divided streams into a stationary body of cream. In practicing the invention a container having a bottom wall made of some suitable porous material of exceedingly fine porosity may be provided for holding the cream and means employed for dispensing air under pressure in minute jets or streams into the cream disposed in the container. The air introduced into the cream in this manner produces bubbles which quickly break down into a very fine structure and form a very excellent whip. To speed up the whipping operation the cream may be gently stirred by some suitable stirring device such as a spoon or ladle, the effect of which is to destroy any fissures or air passages which may be formed in the cream if allowed to stand still. For this purpose only a very gentle stirring is required and which like the adding of the air has very little destructive action upon the structure of the emulsion.

It is essential in producing a whip by this method that the porous medium comprising the bottom wall of the container have an extremely fine porosity and that the air pressure applied thereto be such that it will furnish sufficient air to charge the cream but insufficient to force the air entirely through the cream or blow the cream from the container.

In the accompanying drawings there is illustrated a form of cream whipping device which is constructed for practicing the invention. Fig. 1 is a vertical section taken through the center line of the device; and Fig. 2 a horizontal section of the same taken on the line II of Fig. 1.

Referring in detail to the drawings, a container 1 is employed for holding a quantity of cream to be whipped. The bottom wall 2 of this container is formed of a filter type of stone having a very fine porosity and of sufficient thickness to give it the necessary strength and air dispersing qualities required. To prevent leakage the stone is suitably secured in the container in such a manner that the cream and air cannot pass between its periphery and the wall of the container.

In the simplified form of structure illustrated, a cylindrical base 3 is provided for supporting container 1, and in it there is provided a pressure chamber 4 below stone 2 which is formed by an air-tight wall 5 secured in the base a short distance from its upper edge. To render the pressure chamber airtight when the container is placed upon the base a flat yieldable ring-shaped gasket 6 made of some suitable compressible sanitary material, such as cork or material of that character is placed between the bottom of the container and an inwardly extending flange 7 formed about the upper edge of the base cylinder.

In order to firmly and detachably hold the container on the base and at the same time make the connection leak-tight, a plurality of lugs 8, the number of which depends upon the size of the container, are secured about the bottom of container 1 for cooperative engagement with a plurality of trunk type latches 9 secured about the top of base 3. Each of these latches consists of a link 11 which is pivotally mounted on a lever 12 that is in turn pivotally secured to a support 13 mounted on the base 3. To assemble the machine the gasket 6 is placed on flange 7 and container 1 on top of the gasket with lugs 8 in alignment with latches 9. The levers 12 are then raised sufficiently to allow the links 11 to be placed over the tops of the lugs 8. When this is done the levers are forced downward against the wall of the base, whereby due to the eccentric mounting of the links on the levers the container is forced firmly into engagement with the base.

For supplying air under pressure to pressure chamber 4 a rotary compressor 14 is arranged on a support 15 in the bottom of base 3 and its outlet 16 is connected by means of a flexible conduit 17 to an inlet 18 formed in wall 5. For operating the compressor an electric motor 19 is also mounted upon the support 15 and operably coupled to the compressor by means of a belt 21, an ordinary conduit and plug 22 being provided for connecting the motor to a light circuit.

In order that access to the motor may be readily had for the purpose of cleaning and repairing it, support 15 is attached at one end by means of a hinge 23 to one side of the base 3 and by means of a latch 24 to the other side. Hence, when it is desired to have access to the motor or compressor the support 15 may be readily rotated outside of the base. To permit such movement the flexible conduit 17 is made sufficiently long to allow the compressor to be moved outside of the base without disturbing its connection with the pressure chamber.

In practicing the invention, I have found that it is essential that the medium employed for forming the bottom wall 2 of the container be made of a material having not only an exceedingly fine porosity, but that it have the ability to disperse the air in a very restricted manner into the cream. The most satisfactory material found to date for this purpose, which is capable of functioning satisfactorily, is what is known in the art as filter stone, and is a type of sandstone having an exceedingly fine porous structure.

In operating the machine to produce a whip, motor 19 is preferably started before the cream is placed in container 1. When the cream is put in the container and the air is forced upwardly through stone 2, to destroy the formation of fissures or air openings in it, which if permitted allow the air to escape and thereby retard the formation of the whip, the cream may be gently stirred by means of a suitable stirring device such as a spoon or ladle. This operation is continued until sufficient air is entrapped in the cream and the structure broken down to a sufficiently fine state to produce a satisfactory whip. Normally such operation requires from one to two minutes, which is a considerably shorter time than that required to produce a whip by the old agitating process.

To remove the whipped cream, the container may be detached from base 3 by releasing latches 9 and the cream emptied into any suitable receptacle. To assist in removing the cream from the container, a screen 25 of fine mesh having a diameter substantially the same as the inside of the container may be placed on the top of the stone 2 before the cream is added and removed after the whipping is completed, by means of a handle 26 arranged to extend to the top of the container. To clean the apparatus after it has been used, the container and stone are preferably washed in boiling water and then placed back on the base and the air turned on until the stone is thoroughly dried.

A suitable machine capable of whipping from one to four pints of cream may be formed with a container 1 having a diameter of from six to seven inches and a sufficient height to hold the whip. The stone forming the bottom may be made from one-quarter to one inch thick and preferably with a porosity of a degree known in the filter art as grade H. To supply the necessary air pressure a fiftieth-horse power motor may be coupled in any suitable manner, such as by means of a belt 21, to a compressor capable of producing in response to the motor a pressure in the pressure chamber of from 3 to 8 or 10 oz. per square inch. These particular pressures are specified as it has been found that it is practically impossible to whip the cream in a machine of this character if the pressure is below 3 oz., and where it is above 10 oz. the air is usually forced completely through the cream instead of being entrapped in it, and also causes much cream to be blown from the container. It will be appreciated that for larger or smaller machines the size of the parts will be varied in accordance with the capacity of the machines.

As set forth above, the main advantages of the invention are that through its use creams having a considerably low butter fat content may be satisfactorily whipped, the whipping may be accomplished in a much shorter time and a considerably larger volume of whip obtained therefrom than has been heretofore possible. Also, by its use it is possible to not only whip cream at practically any temperature or at any age, but to also rewhip it to its original state after it has once collapsed. Furthermore, the whip produced is drier and has a longer life.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim:

1. The method of whipping cream consisting of forcing air in minutely divided streams of finely separated bubbles into the bottom of a body of cream until a satisfactory whip is produced.

2. The method of whipping cream consisting of forcing air in finely divided streams of bubbles into the bottom of a body of cream and expediting the whipping process by gently stirring the cream as the air is supplied to it until a satisfactory whip is produced.

3. The method of whipping cream consisting of forcing air in finely divided streams at a pressure of not less than 3 ounces per square inch into a body of cream until a satisfactory whip is produced.

4. The method of whipping cream consisting of forcing air through a porous medium into a stationary body of cream until a satisfactory whip is produced.

5. The method of whipping cream consisting of forcing air through a porous stone into a body of cream until a satisfactory whip is produced.

6. A method of whipping cream consisting of separating and inflating the butter fat cells with air to prevent coalescence by forcing air through a porous wall into the cream in the form of controlled streams of bubbles of substantially microscopic size until a satisfactory whip is produced.

In testimony whereof, I sign my name.

LEE ROUSH.